United States Patent [19]

Campana et al.

[11] 4,447,083
[45] May 8, 1984

[54] NET RECOVERY DEVICE AND METHOD

[75] Inventors: Jerry M. Campana; Richard B. Day, both of Bremerton, Wash.

[73] Assignee: The United States of America as represented by the Secretary of the Navy, Washington, D.C.

[21] Appl. No.: 395,528

[22] Filed: Jul. 6, 1982

[51] Int. Cl.³ .............................................. B64D 1/22
[52] U.S. Cl. .............................. 294/66 R; 244/137 R
[58] Field of Search ............ 294/66, 74, 67 R, 67 BA, 294/67 DA, 67 DB, 77; 244/137 R; 114/240 R, 241; 441/86, 87, 136

[56] References Cited

U.S. PATENT DOCUMENTS 3,647,253 3/1972 Hettinger et al. ...................... 294/66
3,921,943 11/1975 Munro et al. ......................... 244/137
4,138,077 2/1979 Okumura ........................... 244/118 P Primary Examiner—James B. Marbert
Attorney, Agent, or Firm—R. F. Beers; Charles D. B. Curry

[57] ABSTRACT

A net recovery system for recovering torpedoes or the like from the surface of the water. The net recovery system consists of a net shaped into the configuration of the surface of a cone having a closed apex and an open circular base. A rigid hoop is attached to the open circular base. A main lift line has one end connected to a firing mechanism, such as a helicopter, and the other end connected to a releasable hook. A releasable lift line is connected at one end to the releasable hook and the other end connected to the apex of the net. A hoop lift line has one end connected to the main lift line above the releasable hook and the other end connected to the hoop. A net lift line has one end connected to the main lift line above the releasable hook and the other end connected to the apex of the net. The net lift line is substantially longer than the hoop lift line and the hoop lift line is substantially longer than the releasable lift line. A typical recovery method is for the helicopter pilot to (1) lower the net system by the apex of the net with the open hoop directly over the torpedo until the torpedo is within the net, (2) actuate the releasable hook that releases the releasable lift line from the apex of the net, (3) raise the helicopter and the main lift line and net lift line (that has slack and is connected to the apex) which captures the torpedo in the net, and (4) raise the net and torpedo from the water by the hoop lift line and the net lift line which preferably have lengths selected to hold the torpedo in the horizontal position in the net. By configuring the lift lines in various ways either vertical or horizontal floating torpedoes can be recovered.

15 Claims, 6 Drawing Figures

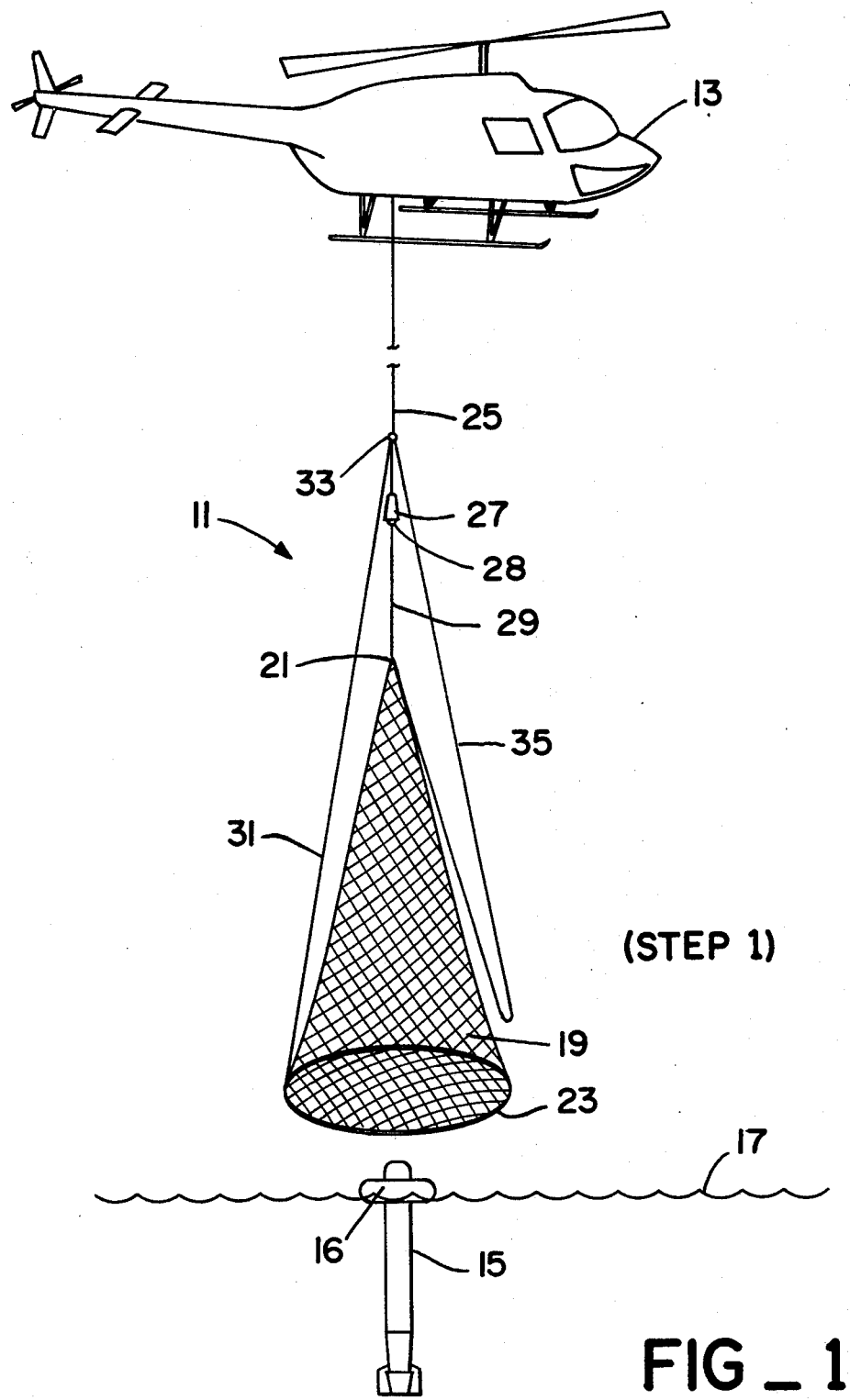
(STEP 1)
FIG_1

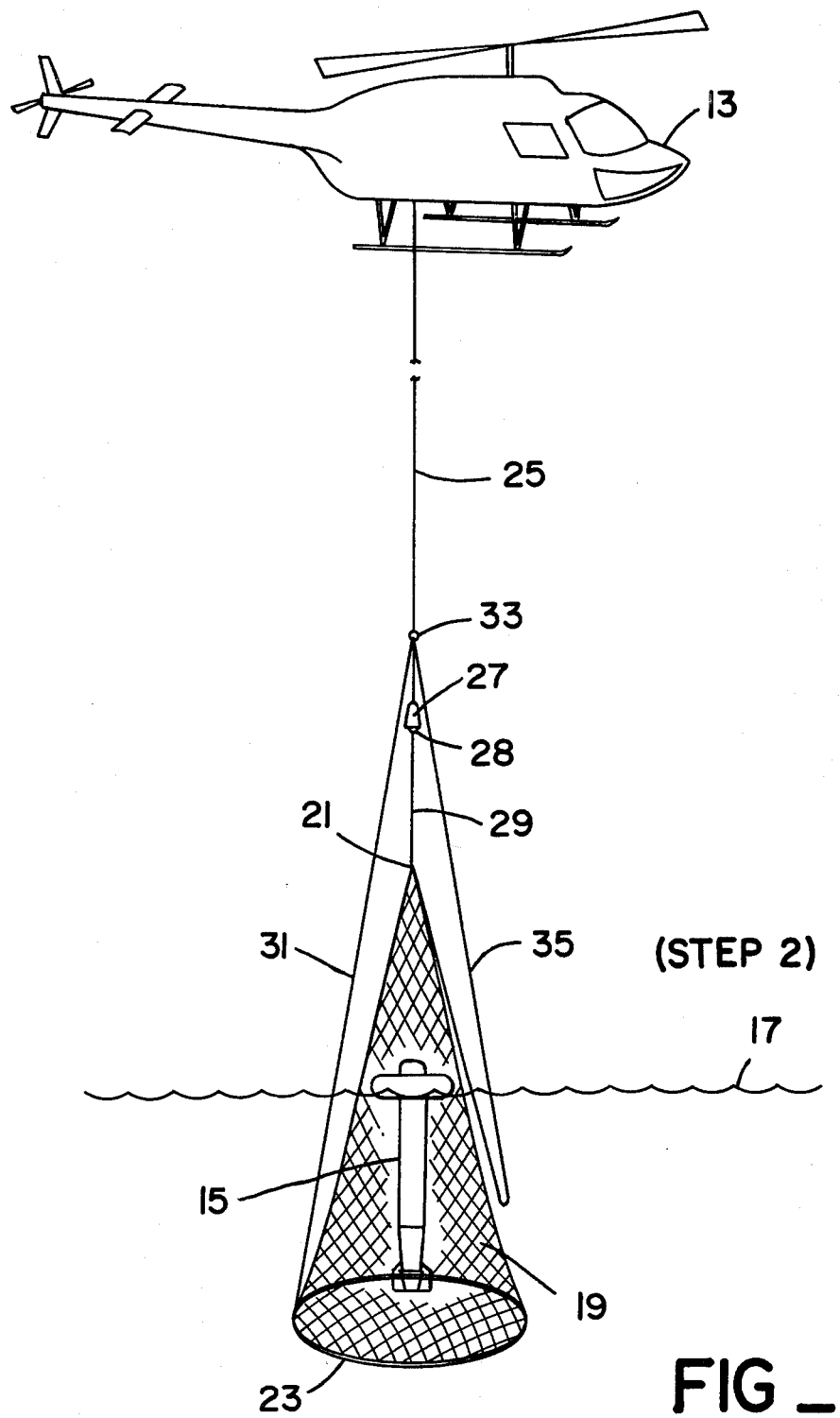
FIG_2

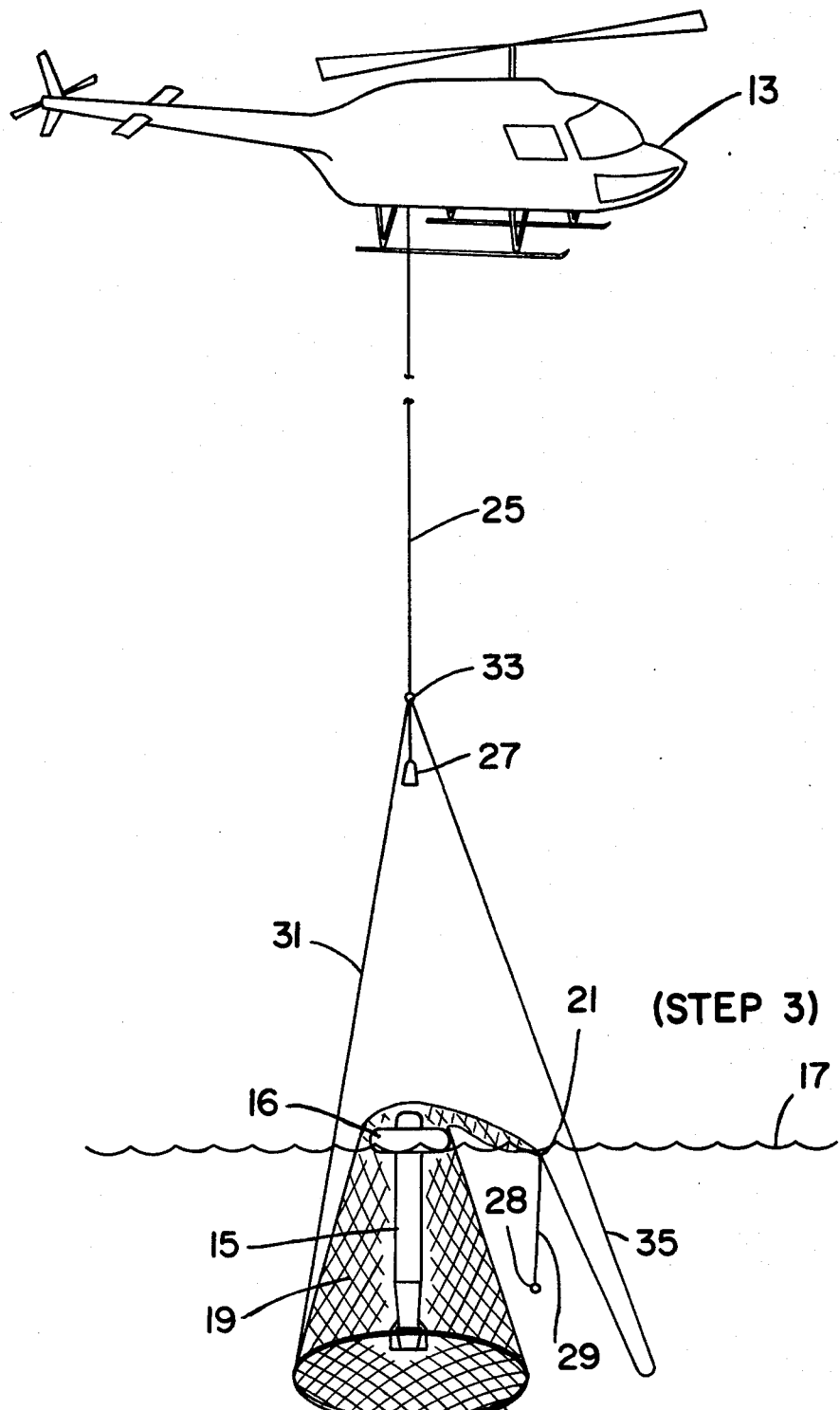
FIG _ 3

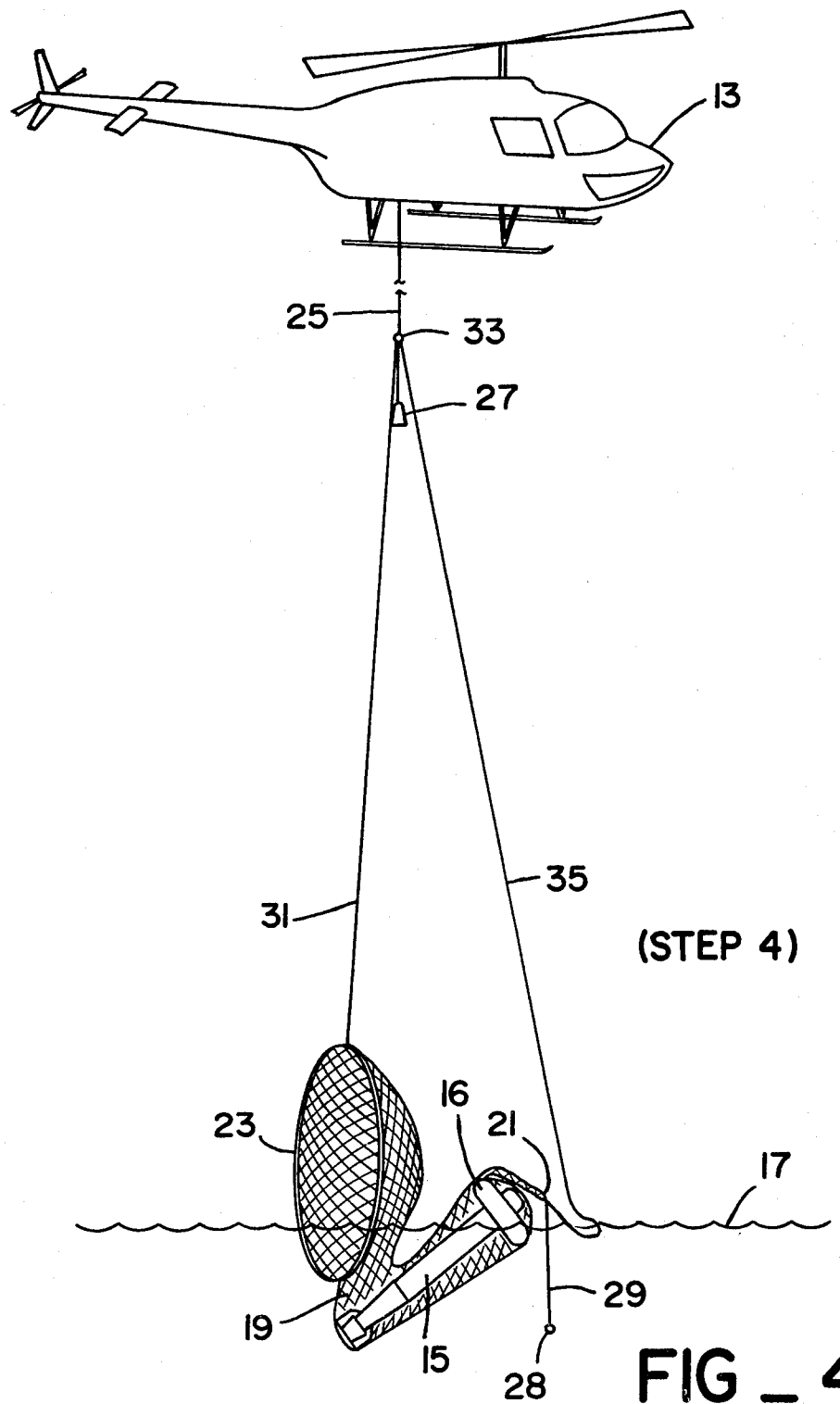
(STEP 4)
FIG_4

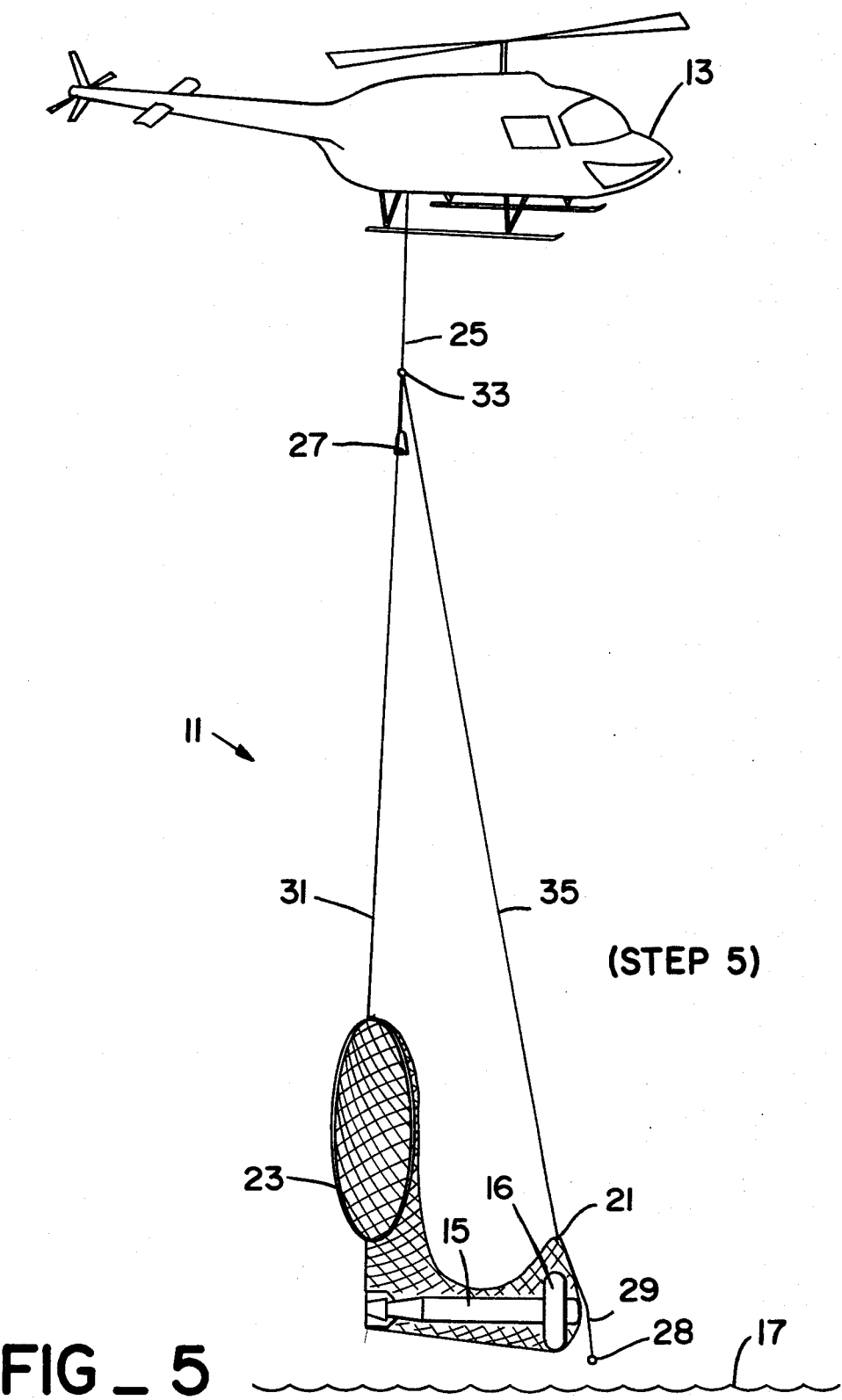
FIG_5

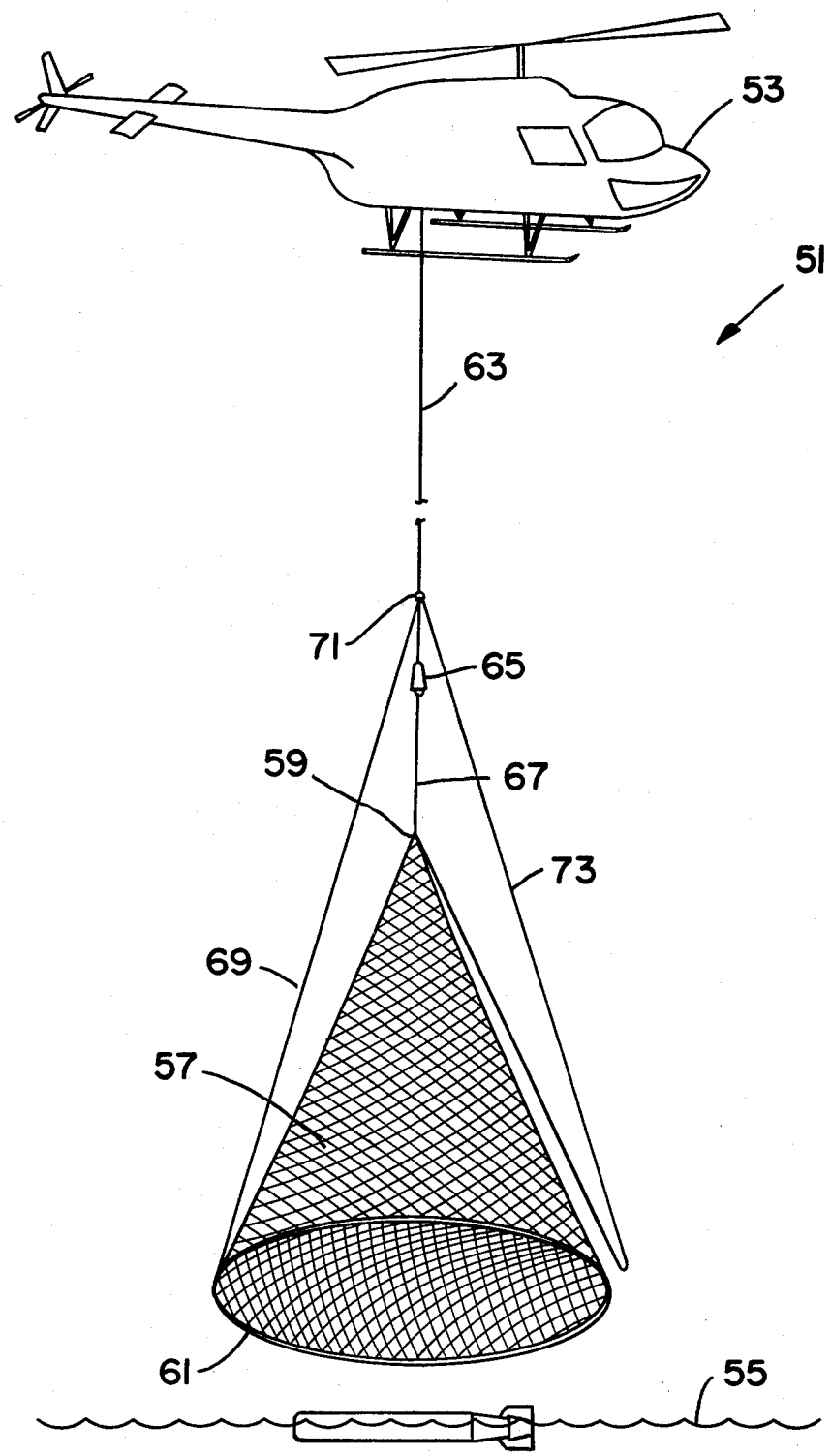
FIG_6

NET RECOVERY DEVICE AND METHOD

BACKGROUND OF THE INVENTION

1. Field of the Invention

The present invention relates to a net recovery system and more particularly to a net recovery system suitable for recovering torpedoes by a helicopter.

2. Description of Prior Art

The usual method for torpedo recovery from the surface of the water is to use a torpedo recovery boat. However, helicopter systems have been used that employ various types of clamps, snares and metal cages. The disadvantages of these prior systems include high systems costs and difficulty in securing to a floating torpedo especially in high sea states. In general these prior systems have been unreliable, hazardous or dangerous to use, and have resulted in a high percent of damage to both torpedoes and recovery systems.

The present invention overcomes these disadvantages by providing an inexpensive and highly reliable recovery system that virtually eliminates all damage to the torpedo and recovery system.

SUMMARY OF THE INVENTION

Briefly, the present invention comprises a net recovery system for recovering torpedoes or the like from the surface of the water. The net recovery system consists of a net shaped into the configuration of the surface of a cone having a closed apex and an open circular base. A rigid hoop is attached to the open circular base. A main lift line has one end connected to a lifting mechanism, such as a helicopter, and the other end connected to a releasable hook. A releasable lift line is connected to one end to the releasable hook and the other end connected to the apex of the net. A hoop lift line has one end connected to the main lift line above the releasable hook and the other end connected to the hoop. A net lift line has one end connected to the main lift line above the releasable hook and the other end connected to the apex of the net. The net lift line is substantially longer than the hoop lift line and the hoop lift line is substantially longer than the releasable lift line. A typical recovery method is for the helicopter pilot to (1) lower the net system by the apex of the net with the open hoop directly over the torpedo until the torpedo is within the net, (2) actuate the releasable hook that releases the releasable lift line from the apex of the net, (3) raise the helicopter and the main lift line and net lift line (that has slack and is connected to the apex) which captures the torpedo in the net, and (4) raise the net and torpedo from the water by the hoop lift line and the net lift line which preferable have lengths selected to hold the torpedo in the horizontal position in the net. By configuring the lift lines in various way either vertical or horizontal floating torpedoes can be recovered.

STATEMENT OF THE OBJECTS OF THE INVENTION

An object of the present invention is to provide an effective net recovery system;

Another object of the present invention is to provide a net recovery system that is particularly suitable for recovering torpedoes;

Still another object of the present invention is to provide a net recovery system that is effectively deployed from a helicopter for capturing floating torpedoes or other objects;

A further object of the present invention is to provide an inexpensive recovery system;

A still further object is to provide a net recovery system that minimizes damage to torpedoes and to the recovery system;

A still further object is to provide a net recovery system that may be used to capture torpedoes that are floating vertically or horizontally;

Other objects, advantages and novel features of the invention will become apparent from the following detailed description of the invention when considered in conjunction with the accompanying drawings wherein:

BRIEF DESCRIPTION OF THE DRAWINGS

FIG. 1 is a pictorial view of one embodiment of the airborne net recovery system of the present invention being positioned directly over a vertically floating torpedo;

FIG. 2 is a pictorial view of the FIG. 1 net recovery system after it has been lowered over the floating torpedo;

FIG. 3 is a pictorial view of the FIG. 1 net recovery system after the releasable lift line has been released;

FIG. 4 is a pictorial view of the FIG. 1 net capture of the partially floating torpedo as the hoop of the net recovery system is raised;

FIG. 5 is a pictorial view of the FIG. 1 horizontal net capture of the torpedo as it is raised out of the water;

FIG. 6 is a pictorial view of another embodiment of the airborne net recovery system of the present invention being positioned directly over a horizontally floating torpedo.

DESCRIPTION OF THE PREFERRED EMBODIMENT

In FIG. 1 is illustrated the net recovery system 11 being supported airborne by a helicopter 13 over a vertically floating torpedo 15, supported by balloon device 16, in ocean 17. The net recovery system consists of a cone shaped net 19 having a closed apex 21 and an open circular base. A rigid hoop 23 is attached to the open circular base. A main lift line 25 has one end connected to helicopter 13 or to a hoist mounted on the helicopter and the other end connected to a releasable member such as releasable hook device 27 that is remotely releasable from the helicopter. It is to be understood that any form of lifting mechanism could be used in place of the helicopter and that remotely actuated releasable hook devices are well known to those skilled in the art. Such a device may include a releasable hook or pin that interacts with and captures ring 28 that is connected to one end of a releasable lift line. The net recovery system includes a releasable lift line 29 that has one end connected to ring 28, that is captured by releasable hook device 27, and the other end connected to apex 21 of the net. A hoop lift line 31 has one end connected to the main lift line 25 at position 33, that is above releasable hook device 27, and the other end connected to rigid hoop 23. A net lift line 35 has one end connected to the main lift line 25 at position 33 and the other end connected to the apex 21 of the net. In this embodiment the net lift line 35 is substantially longer than the hoop lift line 31 and the hoop lift line is substantially longer than the releasable lift line 29. The following are examples of the net recovery system that have been found effective for capturing floating torpedoes. It is to be understood that the dimensions and materials may be changed depending upon the intended use and objects to be captured provided such changes are consistent with the teachings of the present invention.

EXAMPLE I (Vertically Floating Torpedoes-FIGS. 1 through 5)

| Net 19 | |
|---|---|
| height | 17 feet |
| circumference | 30 feet |
| mesh | 3¼ inch mesh × 120 thread |
| material | nylon |
| Hoop 23 | |
| circumference | 30 feet |
| diameter | 2 inch nominal |
| material | aluminum pipe |
| Releasable lift line 29 | 5 feet |
| Hoop lift line 31 | 27 feet |
| Net lift line 35 | 40 feet |
| Total weight | 150 pounds |

EXAMPLE II (Horizontally Floating Torpedoes-FIG. 6)

| Net 19 | |
|---|---|
| height | 17 feet |
| circumference | 47 feet |
| mesh | 3¼ mesh × 120 thread |
| 23 | |
| circumference | 47 feet |
| diameter | 2 inch nominal |
| material | aluminum pipe |
| Releasable lift line 29 | 5 feet |
| Hoop lift line 31 | 27 feet |
| Net lift line 35 | 45 feet |
| Total weight | 200 pounds |

The method of capturing the torpedo 15 with the net recovery system is as follows:

Step 1 (FIG. 1). Helicopter 13 supports net recovery system 11 by main lift line 25 and releasable lift line 29 such that hoop 23 is directly over torpedo 15. During this operation lift line 29 is providing the entire support for the net recovery system, hook lift line 31 and net lift line 35 are slack, and the center line of the cone defined by net 19 is vertical and is directly over and in alignment with torpedo 15.

Step 2 (FIG. 2). The pilot of helicopter 13 lowers hoop 23 and net 19 over the torpedo until it is completely surrounded by the net. During this operation releasable lift line 29 is still providing the entire support for the net recovery system, hoop lift line 31 and net lift line 35 are still slack, and the center line of the cone defined by net 19 is vertical and coincident with the center line of torpedo 15.

Step 3 (FIG. 3). The pilot of helicopter 13 remotely actuates releasable hook device 27 that releases lift line 29. This releases the apex 21 of net 19 so that apex 21 and releasable lift line 29 (now detached from hook 27) both become slack as shown in FIG. 3. In this example, balloon device 16 is supporting net 19 at its upper region and hoop lift line 31 and net lift line 35 still remain slack. It should be noted that during this step the weight of the net recovery system may be sufficient to cause tension to be placed on hoop lift line 31 and, thereby, cause skewing of the hoop and net to partially capture the torpedo 15.

Step 4 (FIG. 4). The pilot raises helicopter 13 which lifts hoop 23 by means of hoop lift line 31 which captures torpedo 15 in net 19. During this step torpedo 15 is still in the water, hoop 15 is partially out of the water and net lift line 35 is still slack.

Step 5 (FIG. 5). The pilot raises the helicopter 13 further which raises net 19 and torpedo 15 from the water by hoop lift line 31 and net lift line 35 which are connected to main lift line 25 and have lengths selected to hold the torpedo in the horizontal position in the net.

In FIG. 6 is shown another embodiment of the present invention that has been found to be suitable for capturing torpedoes floating in the horizontal position. In this embodiment the net recovery system 51 is being supported airborne by a helicopter 53 over a horizontally floating torpedo, having a positive bouyancy, in ocean 55. The net recovery system consists of a cone shaped net 57 having a closed apex 59 and an open circular base. A rigid hoop 61 is attached to the open circular base. A main lift line 63 has one end connected to helicopter 53 or to a hoist mounted on the helicopter and the other end connected to releasable hook device 65 that is remotely releasable from the helicopter. It is to be understood that any form of lifting mechanism could be used in place of the helicopter and that remotely actuated releasable hooks are well known to those skilled in the art. The net recovery system includes a releasable lift line 67 that has one end connected to releasable hook device 65 and the other end connected to apex 59 of the net. A hoop lift line 69 has one end connected to the main lift line 63 at position 71, that is above releasable hook device 65, and the other end connected to rigid hoop 61. A net lift line 73 has one end connected to the main lift line 63 at position 71 and the other end connected to the apex 59 of the net. In this embodiment the net lift line 73 is substantially longer than the hoop lift line 69 and the hoop lift line is substantially longer than the releasable lift line 67. In this embodiment the open circular base and hoop 61 are made to be substantially larger than that of the FIG. 1 embodiment. This was done so that the hoop would fit over the horizontal torpedo. It has been found that when the torpedo is captured and lifted from the water that it shifts to a nearly horizontal position in the net.

It is to be understood that the present invention is not limited to recovering only torpedoes but may be used to capture any floating object that is small enough to pass through the hoop and large enough to not fall through the mesh of the net. Moreover, the net recovery system may be used for submerged objects as well as objects that are out of the water so long as they may be placed within the net. It is to be understood also that various materials may be used, and that the length of lines may be varied to accommodate different shaped and sized objects that are to be captured. However, the previously described embodiments have been found to be particularly useful for recovering floating objects and particularly torpedoes.

What is claimed is:
1. A net recovery device comprising:
   (a) a net having a closed end and an open end, said open end having a periphery;
   (b) a rigid member attached to and contiguous with the entire length of said periphery;
   (c) a first lift line having one end connected to a releasable hook device;

(d) a second lift line having one end attached to said releasable hook device and the other end connected to said closed end of said net;

(e) a third lift line having one end attached to said first lift line and the other end connected to said rigid member;

(f) a fourth lift line having one end attached to said first lift line and the other end connected to said closed end of said net; and (g) said fourth lift line being longer than said third lift line, and said third lift line being longer than said second lift line.

2. The device of claim 2 wherein:
(a) said net defines the surface of a cone where said closed end is the apex and said periphery is the circular base of said cone.

3. The device of claim 2 wherein:
(a) said rigid member is a circular hoop.

4. The device of claim 3 wherein:
(a) said circular hoop comprises about two inch diameter aluminum pipe having a circumference of about thirty feet.

5. The device of claim 4 wherein:
(a) said net comprises nylon material having less than a 3½ inch mesh and a height of about seventeen feet from apex to base.

6. The device of claim 5 wherein:
(a) said second lift line has a length of about five feet;
(b) said third lift line has a length of about twenty-seven feet; and
(c) said fourth lift line has a length of about forty feet.

7. The device of claim 3 wherein:
(a) said circular hoop comprises about two inch diameter aluminum pipe having a circumference of about forty-seven feet.

8. The device of claim 7 wherein:
(a) said net comprises nylon material having less than a 3½ inch mesh and a height of about seventeen feet from apex to base.

9. The device of claim 8 wherein:
(a) said second lift line has a length of about five feet;
(b) said third lift line has a length of about twenty-seven feet; and
(c) said fourth lift line has a length of about forty-five feet.

10. A net assembly for attachment to a main lift line having a releasable member at one end and the other end connected to power means for raising and lowering said releasable member, wherein said net assembly comprises:
(a) a net defining the surface of a cone having a closed apex and an open base defined by a circular periphery;
(b) a rigid circular hoop attached to and contiguous with said circular periphery of said net;
(c) a releasable lift line having one end including attachment means for connection to said releasable member and the other end connected to said apex of said net;
(d) a hoop lift line having one end for connection to said main lift line and the other end connected to said hoop;
(e) a net lift line having one end for connection to said main lift line and the other end connected to said apex of said net; and
(f) said net lift line being longer than said hoop lift line and said hoop lift line being longer than said releasable lift line.

11. The net assembly of claim 10 wherein:
(a) said circular hoop comprises about two inch diameter aluminum pipe having a circumference of from about thirty feet to about forty-seven feet.

12. The net assembly of claim 11 wherein:
(a) said net comprises nylon material having less than a 3½ inch mesh and a height of about seventeen feet from apex to base.

13. The net assembly of claim 12 wherein:
(a) said releasable lift line has a length of about five feet;
(b) said hoop lift line has a length of about twenty-seven feet; and
(c) said net lift line has a length of from about forty feet to about forty-five feet.

14. The method of recovering an object using a net recovery device having a main lift line including a releasable member at one end and the other end connected to power means for raising and lowering said releasable member, a net defining the surface of a cone having a closed apex and an open base defined by a circular periphery, a rigid circular hoop attached to and contiguous with said circular periphery of said net, a releasable lift line having one end connected to said releasable member and the other end connected to said apex, a hoop lift line having one end connected to said main lift line and the other end connected to said hoop, a net lift line having one end connected to said main lift line and the other end connected to said apex, and suspending said net recovery device airborne by said power means whereby said releasable lift line supports said net with said apex being directly above said hoop comprising the steps of:
(a) lowering said net recovery device and surrounding said object with said net;
(b) releasing said apex by releasing said releasable member and said releasable support line;
(c) raising said hoop with said hoop lift line;
(d) raising said apex with said net lift line; and
(e) raising said object in said net.

15. The method of claim 14 wherein said object is a torpedo floating on water in the vertical position the further step comprising:
(a) raising said torpedo in the horizontal position.

* * * * *